(12) United States Patent
Park et al.

(10) Patent No.: US 9,465,229 B2
(45) Date of Patent: Oct. 11, 2016

(54) IMAGE STABILIZER AND ELECTRONIC APPARATUS INCLUDING THE SAME

(71) Applicant: SAMSUNG ELECTRONICS CO., LTD., Suwon-si, Gyeonggi-do (KR)

(72) Inventors: Chi-young Park, Suwon-si (KR); Byung-jin Yoo, Cheongju-si (KR); Kwang-seok Byon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 14/095,027

(22) Filed: Dec. 3, 2013

(65) Prior Publication Data

US 2014/0355118 A1 Dec. 4, 2014

(30) Foreign Application Priority Data

Jun. 3, 2013 (KR) ......................... 10-2013-0063605

(51) Int. Cl.
- *G02B 27/64* (2006.01)
- *H04N 5/232* (2006.01)
- *G03B 5/00* (2006.01)

(52) U.S. Cl.
CPC ............... *G02B 27/646* (2013.01); *G03B 5/00* (2013.01); *H04N 5/23287* (2013.01); *G03B 2205/0015* (2013.01); *G03B 2205/0069* (2013.01)

(58) Field of Classification Search
CPC ......... G02B 27/64–27/648; G03B 5/00–5/08; G03B 2205/00–2205/0092; H04N 5/232–5/23296
USPC .............................. 359/554–557; 396/52–55; 348/208.1–208.99
See application file for complete search history.

(56) References Cited

U.S. PATENT DOCUMENTS

| 7,650,065 B2 | 1/2010 | Takahashi |
| 2006/0091733 A1 | 5/2006 | Binnard et al. |
| 2009/0201381 A1* | 8/2009 | Byon ................. H04N 5/23248 348/208.11 |
| 2010/0178044 A1* | 7/2010 | Ohno ....................... G03B 5/00 396/55 |

(Continued)

FOREIGN PATENT DOCUMENTS

| JP | 2012-088432 A | 5/2012 |
| KR | 10-0646560 B1 | 11/2006 |
| KR | 10-1069619 B1 | 10/2011 |

OTHER PUBLICATIONS

Extended European Search Report issued for EP 14153221.8 (Feb. 25, 2015).

*Primary Examiner* — Bumsuk Won
*Assistant Examiner* — Jeffrey Madonna
(74) *Attorney, Agent, or Firm* — Drinker Biddle & Reath LLP

(57) ABSTRACT

An image stabilizer includes a correction lens module including a correction lens and a correction lens supporting plate to which the correction lens is coupled, a plurality of drivers configured to move the correction lens module in a direction perpendicular an optical axis, each driver including a magnet member fixed to the correction lens supporting plate and a coil configured to react to the magnet member, and a plurality of location restoration units disposed to face the plurality of drivers, configured to restore the correction module to an initial location, and including magnetic bodies. The magnet member may include a first magnet, a second magnet, and a third magnet coupled in one body.

20 Claims, 12 Drawing Sheets

(56) References Cited

U.S. PATENT DOCUMENTS

| | | |
|---|---|---|
| 2010/0316363 A1 | 12/2010 | Chou |
| 2011/0001836 A1 | 1/2011 | Chiang |
| 2011/0181740 A1 | 7/2011 | Watanabe et al. |
| 2011/0188841 A1* | 8/2011 | Ohno ................... G03B 5/00 396/55 |
| 2012/0075700 A1 | 3/2012 | Ezawa |
| 2012/0188435 A1* | 7/2012 | Fan ................... G02B 7/102 348/340 |
| 2012/0229926 A1* | 9/2012 | Wade ................... G02B 7/08 359/824 |
| 2012/0287517 A1* | 11/2012 | Terajima ............ H02K 41/0356 359/824 |
| 2013/0089311 A1 | 4/2013 | Jung et al. |
| 2013/0300336 A1* | 11/2013 | Ishikawa ................ G03B 5/00 318/610 |
| 2014/0313582 A1* | 10/2014 | Cheng ................... G02B 7/09 359/557 |

* cited by examiner

IMAGE STABILIZER AND ELECTRONIC APPARATUS INCLUDING THE SAME

CROSS-REFERENCE TO RELATED APPLICATION

This application claims priority from Korean Patent Application No. 10-2013-0063605, filed on Jun. 3, 2013, in the Korean Intellectual Property Office, the disclosure of which is incorporated herein by reference in its entirety.

BACKGROUND

1. Field

Apparatuses and methods consistent with exemplary embodiments relate to an image stabilizer and an electronic apparatus including the same, and more particularly, to an image stabilizer capable of implementing miniaturization thereof and an electronic apparatus including the same.

2. Description of the Related Art

In recent years, with wide spread of digital photographing apparatuses such as digital cameras or digital video cameras, consumers increasingly desire the acquisition of high quality still images or moving images using these digital photographing apparatuses. In particular, demands have increased for digital photographing apparatuses including an image stabilizer to prevent degradation of the sharpness of an image due to shaking of a user's hand.

The image stabilizer in the related art employs a method of performing a shake prevention function by moving a correction lens or an imaging apparatus for image stabilization. The image stabilizer in the related art includes a driver configured to operate the correction lens. The driver is driven by a coil and a magnet member, which are configured to generate electromagnetic force. In the image stabilizer of the related art, a detector configured to detect a degree of movement of the correction lens or the driver with respect to a base is disposed in a correction lens supporting plate.

As the digital photographing apparatus is increasingly miniaturized, the image stabilizer of the related art is also designed to be smaller in size. Thus, the driver (the coil and the magnet member) of the image stabilizer is also smaller in size.

However, when the driver (the coil and the magnet member) in the image stabilizer of the related art is shrunken in size, driving force of the driver is reduced and thus performance of the image stabilizer is degraded.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image stabilizer that is small and lightweight and prevents driving force from being degraded, and an electronic device having image capturing and photographing capabilities (e.g., a digital photographing apparatus) including the same.

According to an exemplary embodiment, an image stabilizer may include: a correction lens module including a correction lens and a correction lens supporting plate to which the correction lens is coupled; a plurality of drivers configured to move the correction lens module in a direction perpendicular to an optical axis, each driver including a magnet member fixed to the correction lens supporting plate and a coil configured to react to the magnet member; and a plurality of location restoration units disposed to face the plurality of drivers, configured to restore the lens correction lens module to an initial location, and including magnetic bodies. The magnet member may include a first magnet, a second magnet, and a third magnet coupled in one body.

The first magnet may be disposed proximate to the correction lens and may have a first magnetic field direction, the second magnet may be disposed to be spaced from the first magnet and may have a second magnetic field direction opposite of the first magnetic field direction, and the third magnet may be disposed between the first and second magnets and may have a third magnetic field direction different from the first and second magnetic field directions.

The magnet member may be disposed between the coil and a corresponding location restoration unit of the plurality of location restoration units. When image stabilization is performed, magnetic flux emerging from the first magnet in the first magnetic field direction may flow through the coil and into the second magnet in the second magnetic field direction of the second magnet via the coils, and magnetic flux emerging from the second magnet in the second magnetic field direction may flow through the corresponding location restoration unit and into the first magnet in the first magnetic field direction of the first magnet. The magnetic flux emerging from the first magnet and the magnetic flux emerging from the second magnet may form a first magnetic closed loop circulating the first magnet, the coil, the second magnet, and the location restoration units. A portion of the magnetic flux emerging from the first magnet to flow into the second magnet may flow back into the first magnet via the third magnet in the third magnetic field direction, so that a second magnetic closed loop circulating the first magnet, the coil, the second magnet, and the third magnet may be formed.

The third magnetic field direction may be perpendicular to the first magnetic field direction and the second magnetic field direction.

The first magnet and the second magnet may be disposed symmetrically with respect to the third magnet, and magnetic poles of the first magnet are opposite of the magnetic poles of the second magnet.

A cross-section of the third magnet may be a shape selected from the group consisting of a tetragonal shape, a trapezoidal shape, and a T-character shape.

The first magnet, the second magnet, and the third magnet may be mutually coupled through bonding.

The image stabilizer may further include a plurality of location detectors disposed between the plurality of drivers and the plurality of location restoration units, respectively, and configured to detect movement of the correction lens module.

The plurality of drivers may include a first driver configured to move the correction lens module in a first direction perpendicular to the optical axis, and a second driver configured to move the correction lens module in a second direction perpendicular to the first direction and the optical axis.

The plurality of location restoration units may include a first location restoration unit and a second location restoration unit. A magnet member of the first driver may be disposed between the first location restoration unit and a coil of the first driver. A magnet member of the second driver may be disposed between the second location restoration unit and a coil of the second driver.

The plurality of location detectors may include a first location detector disposed between the first driver and the first location restoration unit and configured to detect movement of the correction lens module in the first direction, and a second location detector disposed between the second driver and the second location restoration unit and configured to detect movement of the correction lens module in the second direction.

The plurality of drivers may further include a third driver disposed opposite of the first driver with respect to the optical axis and configured to move the correction lens module in the first direction together with the first driver, and a fourth driver disposed opposite of the second driver with respect to the optical axis and configured to move the correction lens module in the second direction together with the second driver.

The plurality of location restoration units may further include a third location restoration unit and a fourth location restoration unit. A magnet member of the third driver may be disposed between the third location restoration unit and a coil of the third driver. A magnet member of the fourth driver may be disposed between the fourth location restoration unit and a coil of the fourth driver.

The plurality of location detectors may further include a third location detector disposed between the third driver and the third location restoration unit and configured to detect the movement of the correction lens module in the first direction, and a fourth location detector disposed between the fourth driver and the fourth location restoration unit and configured to detect the movement of the correction lens module in the second direction.

The image stabilizer may further include a base configured to support the correction lens supporting plate to be movable to the direction perpendicular to the optical axis, and a cover part coupled to the base to cover the correction lens supporting plate. The coil may be fixed to a bottom portion of the cover part.

A width of the third magnet may be in a range of about 0.6 mm to about 1.2 mm.

The width of the third magnet may be about 0.9 mm.

The plurality of location restoration units may include yokes.

The plurality of location detectors may include Hall sensors.

According to an exemplary embodiment, an electronic apparatus may include the above-described image stabilizer.

According to various embodiments as described above, driving force of the image stabilizer can be improved, and thus performance of the image stabilizer can be improved.

Further, the same driving force can be implemented using a coil and magnet member that are smaller than those used in the image stabilizer of the related art, and thus miniaturization of the image stabilizer and electronic apparatus can be promoted.

Additional aspects and advantages of the exemplary embodiments will be set forth in the detailed description, will become apparent from the detailed description, or may be learned by practicing the exemplary embodiments.

BRIEF DESCRIPTION OF THE DRAWINGS

The above and/or other aspects will become more apparent by describing in detail exemplary embodiments, with reference to the accompanying drawings, in which.

DETAILED DESCRIPTION

Figure 1:
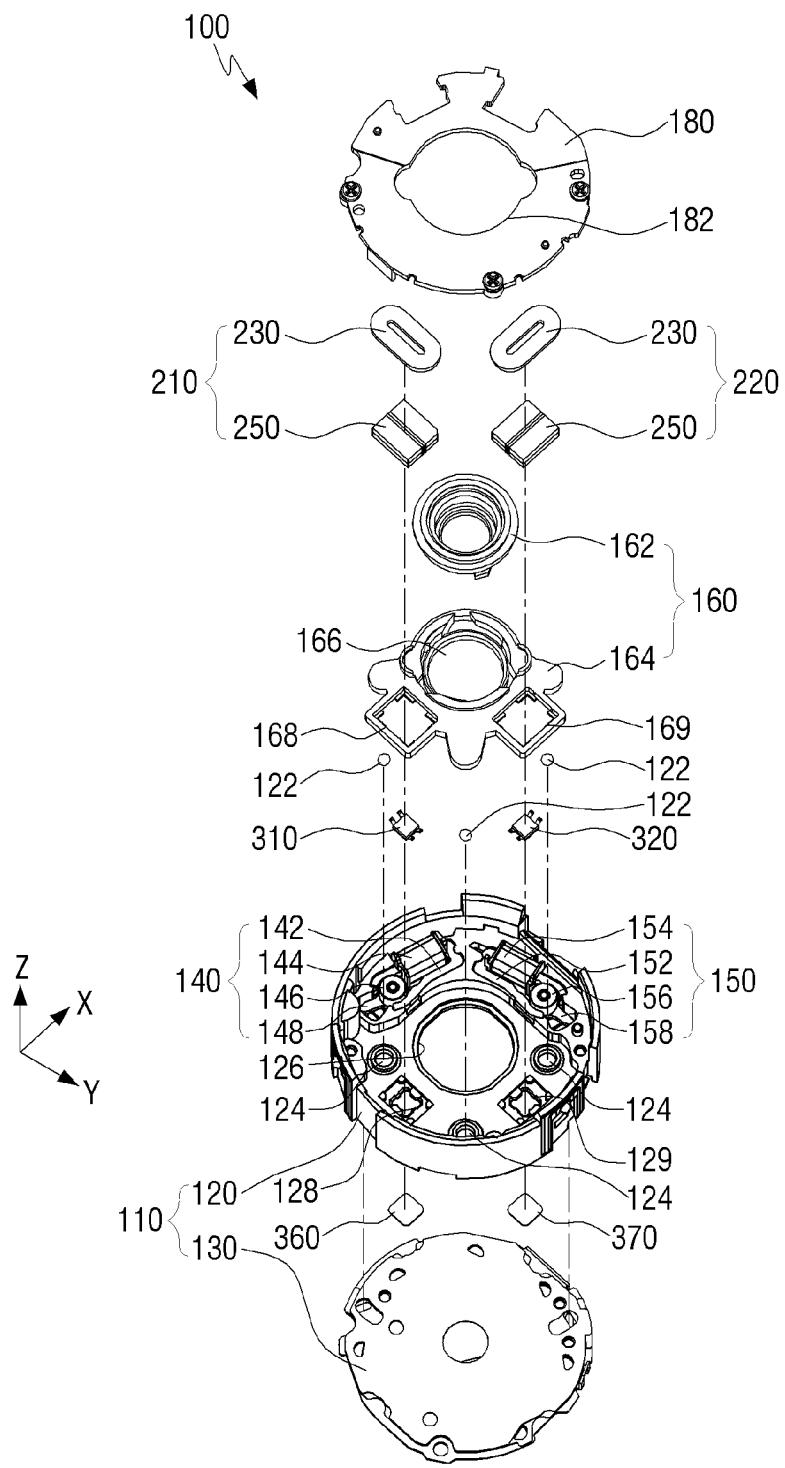
FIG. 1 is an exploded perspective view illustrating an image stabilizer, according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
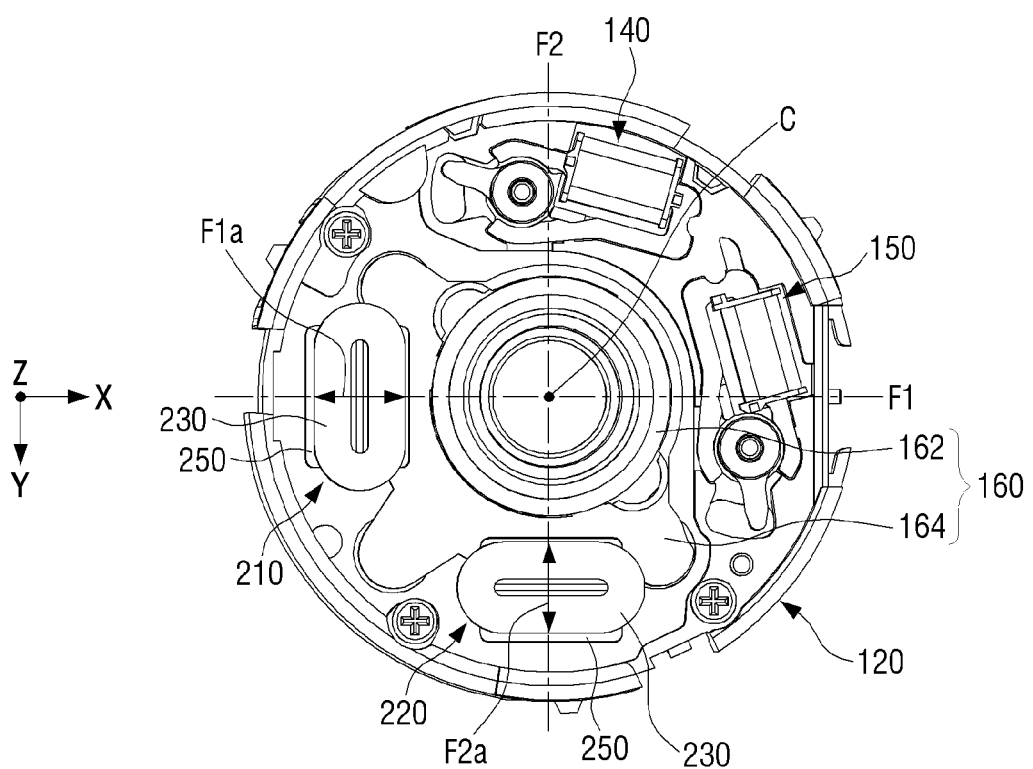
FIG. 2 is a top view illustrating an image stabilizer in which a cover part is omitted, according to an exemplary embodiment.
Figure 3:
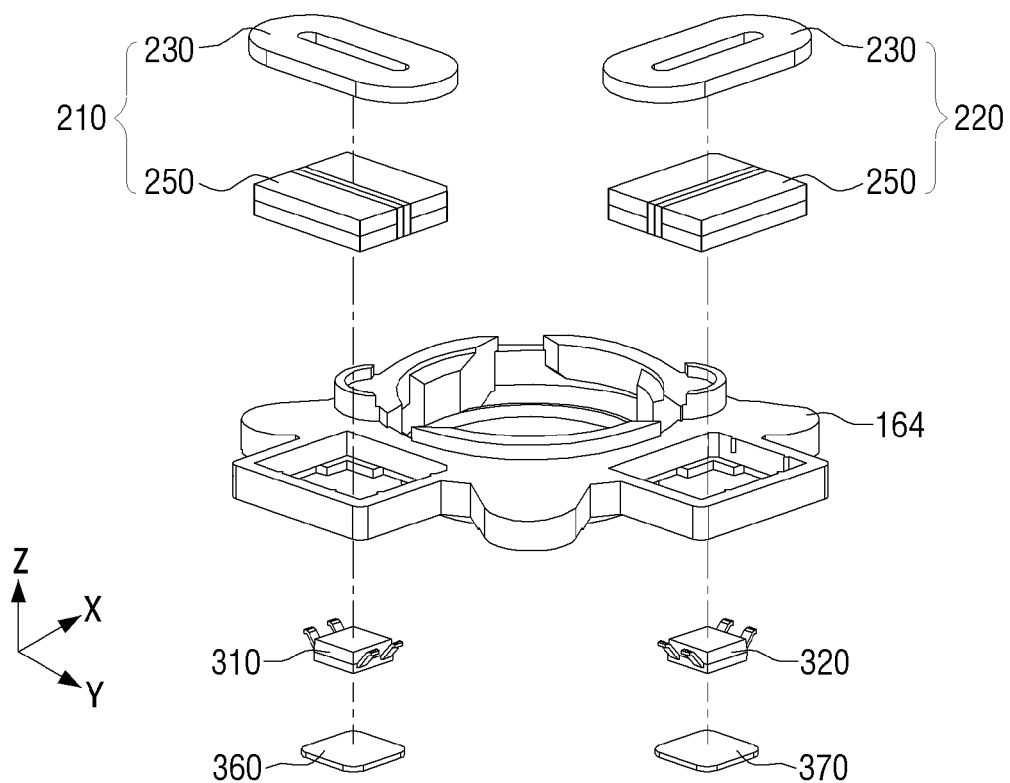
FIG. 3 is an exploded perspective view illustrating an arrangement of a coil, a magnet member, a location detector, and a location restoration unit of the image stabilizer illustrated in FIG. 1.

FIG. 1 is an exploded perspective view illustrating an image stabilizer, according to an exemplary embodiment. FIG. 2 is a top view illustrating the image stabilizer in which a cover part is omitted, according to an exemplary embodiment. FIG. 3 is an exploded perspective view illustrating an arrangement of a coil, a magnet member, a location detector, and a location restoration unit of the image stabilizer illustrated in FIG. 1.

Referring to FIG. 1, the image stabilizer 100 includes a base unit 110, a correction lens module 160, a cover part 180, a plurality of drivers 210 and 220, a plurality of location detectors 310 and 320, and a plurality of location restoration units 360 and 370.

The base unit 110 includes a first base 120 and a second base 130.

The first base 120 supports the correction lens module 160 to move in a first direction (an X-axis direction) perpendicular to an optical axis (a Z-axis direction) and to a second direction (a Y-axis direction) perpendicular to the first direction (the X-axis direction) and the optical axis. A plurality of ball bearings 122 are disposed between the first base 120 and the correction lens module 160 so that the correction lens module 160 can slide or slidably move on the first base 120 in the first direction (the X-axis direction) and the second direction (the Y-axis direction). The plurality of ball bearings 122 are slidably disposed in a plurality of ball bearing receiving holes 124 formed in one surface of the first base 120, respectively, and the plurality of ball bearing receiving holes 124 are spaced apart from each other at an interval. Accordingly, the plurality of ball bearings 122 slidably supports a bottom portion (preferably, a bottom portion of a correction lens supporting plate 164 to be described) of the correction lens module 160 facing a top portion of the first base 120. When shaking occurs, the correction lens module 160 moves in the first direction (the X-axis direction) and the second direction (the Y-axis direction) to increase the sharpness of an image generated from data acquired in an imaging device (not shown), and thus the shaking can be corrected.

A light-passing hole 126 is formed in the first base 120 and is configured to allow light passing through a correction lens 162 of the correction lens module 160 to pass through. A location and size of the light-passing hole 126 may be set by taking into consideration a maximum distance in which the correction lens 162 can be moved in the first direction (the X-axis direction) and the second direction (the Y-axis direction), so that the light passing through the correction lens 162 can pass through the light-passing hole 126 at any location within a movement range of the correction lens module 160.

In the first base 120, a plurality of location detector mounting holes 128 and 129 on which the plurality of location detectors 310 and 320 (to be described later) are formed to pass through the first base 120. The plurality of location restoration units 360 and 370 (to be described later) are mounted on a bottom portion of the first base 120 corresponding to the plurality of location detector mounting holes 128 and 129. Thus, the location detectors 310 and 320 may be disposed over or aligned with the location restoration units 360 and 370, respectively.

The first base 120 is coupled to the second base 130 that is disposed below the first base 120. A pair of shutters (not shown) configured to open and close (shield and unshield) the light-passing hole 126 and to regulate an amount of light incident during photographing are provided on the second base 130. A pair of shutter drivers 140 and 150 is disposed on the first base 120 to drive the shutters.

The pair of shutter drivers 140 and 150 includes first and second shutter drivers 140 and 150. The first and second shutter drivers 140 and 150 may drive the pair of shutters disposed on a bottom portion of the second base 130 to open and close (shield and unshield) the light-passing hole 126 of the first base 120, thereby regulating the amount of light passing through the correction lens 162. The first shutter driver 140 includes a magnetic body 142 for driving the shutter and has a substantially U-character shape, a coil 144 for driving the shutter and that is wound at one side of the magnetic coil 142, and a circular magnet 146 for driving the shutter that is rotatably disposed between front ends of the magnetic body 142. The second shutter driver 150 includes a magnetic body 152 for driving the shutter driving that has a substantially U-character shape, a coil 154 for driving the shutter that is wound at one side of the magnetic coil 154, and a circular magnet 156 for driving the shutter and is rotatably disposed between front ends of the magnetic body 152. Operation levers 148 and 158, which are configured to drive a pair of shutters according to a clockwise rotation and a counterclockwise rotation of the circular magnets 146 and 156, may be coupled to the circular magnets 146 and 156 for driving the shutter, respectively. In the embodiment, a pair of shutters and a pair of shutter drivers have been illustrated, but the invention is not limited thereto, and one of the pair of shutters may be replaced with a neutral density (ND) filter.

The correction lens module 160 includes a correction lens 162 and a correction lens supporting plate 164 configured to support the correction lens 162. A center of gravity of the correction lens module 160 is located at a geometric center point so that the correction lens module 160 is horizontally symmetrical with respect to the geometrical center point.

An optical axis is located at the center of the correction lens 162, and the center of the correction lens 162 coincides with the center of gravity of the correction lens module 160. A mounting hole 166 in which the correction lens 162 is mounted is formed substantially in a center portion of the correction lens supporting plate 164. A first coupling hole 168 and a second coupling hole 169, to which the magnet member 250 of the first driver 210 and the magnet member 250 of the second driver 220 are respectively coupled, are formed in the correction lens supporting plate 164 in a bottom portion thereof.

The cover part 180 is coupled to the first base 120 to cover the correction lens supporting plate 164. A bottom surface of the cover part 180 is disposed to be spaced at a predetermined distance from a top surface of the correction lens supporting plate 164 to ensure an installation space for the coils 230 of the plurality of drivers 210 and 220.

A light-passing hole 182 is formed substantially in a center portion of the cover part 180 to allow external light to pass through toward the correction lens 162. At this time, the light-passing hole 182 of the cover part 180 may be formed to have a larger diameter than the correction lens 162.

The plurality of drivers 210 and 220 move the correction lens module 160 in a direction perpendicular to the optical axis (the Z-axis), and include a first driver 210 and the second driver 220.

The first driver 210 allows the correction lens module 160 to move in the first direction (the X-axis direction) with respect to the first base 120, and includes a coil 230 and a magnet member 250. The second driver 220 allows the correction lens module 160 to move in the second direction (the Y-axis direction) with respect to the first base 120, and includes a coil 230 and a magnet member 250 like the first driver 210.

The coil 230 of the first driver 210 and the coil 230 of the second driver 220 are fixed to the bottom portion of the cover part 180, and the coil 230 of the first driver 210 and the coil 230 of the second driver 220 are disposed at locations facing the first magnet member 250 of the first driver 210 and the magnet member 250 of the second driver 220, respectively. The coil 230 of the first driver 210 and the coil 230 of the second driver 220 are also spaced from the first magnet member 250 of the first driver 210 and the magnet member 250 of the second driver 220, respectively. That is, as illustrated in FIG. 3, the coil 230 of the first driver 210 is disposed to be spaced from the magnet member 250 of the first driver 210 and similarly, the coil 230 of the second driver 220 is disposed to be spaced from the magnet member 250 of the second driver 220.

When a voltage is applied to the coil 230 of the first driver 210 and the coil 230 of the second driver 220 from the outside, electromagnetic force is generated in the coil 230 of the first driver 210 and the coil 230 of the second driver 220. Accordingly, attractive force and repulsive force having desired magnitudes may be generated between the coil 230 and the magnet member 250 of the first driver 210 and between the coil 230 and the magnet member 250 of the second driver 220. Thus, the correction lens module 160 may move by the coils 230 of the first and second drivers 210 and 220.

As illustrated in FIG. 2, a driving force action line F1a in the coil 230 of the first driver 210 is arranged to coincide with a driving force action line F1 crossing the center C of the correction lens 162 (at this time, the center C of the correction lens 162 is located on the optical axis). A driving force action line F2a in the coil 230 of the second driver 220 is arranged to coincide with a driving force action line F2 crossing the center C of the correction lens 162 (at this time, the center C of the correction lens 162 is located on the optical axis). Therefore, the correction lens module 160 may be moved along the driving force action lines F1 and F2 by the coils 230 of the first and second drivers 210 and 220. The correction lens supporting plate 164 may be moved by the ball bearings 122 with respect to the first base 120.

The plurality of location detectors 310 and 320 detect a location of the correction lens module 160, and include a first location detector 310 and a second location detector 320.

The first location detector 310 is mounted on the first location detector mounting hole 128 of the first base 120. The first location detector 310 is disposed to be spaced from the magnet member 250 of the first driver 210 and on a side of the magnet member 250 of the first driver 210 that is opposite of the side to which the coil 230 of the first driver 210 is disposed.

The first location detector 310 may detect movement of the correction lens module 160 in the first direction (the X-axis direction). Specifically, the first location detector 310 may include a Hall sensor configured to detect change in a magnitude of a current or a voltage induced based on an intensity of a magnetic field, when a location of the magnet member 250 of the first driver 210 is changed according to movement of the correction lens supporting plate 164. The first location detector 310 may include other sensors configured to detect the location of the correction lens module 160 other than the Hall sensor.

The second location detector 320 is mounted on the second location detector mounting hole 129 of the first base 120. The second location detector 320 is disposed to be spaced from the magnet member 250 of the second driver 220 and on a side of the magnet member 250 of the second driver 220 that is opposite of the side to which the coil 230 of the second driver 220 is disposed.

The second location detector 320 may detect movement of the correction lens module 160 in the second direction (the Y-axis direction). Specifically, the second location detector 320 may include a Hall sensor configured to detect change in a magnitude of a current or a voltage induced based on an intensity of a magnetic field, when a location of the magnet member 250 of the second driver 220 is changed according to the movement of the correction lens supporting plate 164. The second location detector 320 may include other sensors configured to detect the location of the correction lens module 160 other than the Hall sensor.

The plurality of location restoration units 360 and 370 restore the correction lens module 160 to an initial location, and include a first location restoration unit 360 and a second restoration unit 370.

The first location restoration unit 360 is disposed to face the first driver 210. Specifically, as illustrated in FIG. 3, the first location restoration unit 360 is disposed on a side of the first location detector 310 that is opposite of the side of the first location detector 310 to which the first driver 210 is disposed. The first location restoration unit 360 is mounted on the bottom portion of the first base 120 and disposed below the first location detector mounting hole 128.

The first location restoration unit 360 may include a magnetic body, and in the current embodiment, the first location restoration unit 360 includes a yoke. This is merely exemplary, and the first location restoration unit 360 may include another magnetic body. Accordingly, attractive force is formed between the first location restoration unit 360 and the magnet member 250 of the first driver 210, and the correction lens module 160 may adhere to the first base 120 or return to the initial location due to the attractive force.

The second location restoration unit 370 is disposed to face the second driver 220. Specifically, as illustrated in FIG. 3, the second location restoration unit 370 is disposed on a side of the second location detector 320 that is opposite of the side to which the second driver 220 is disposed. The second location restoration unit 370 is mounted on the bottom portion of the first base 120 and disposed below the second location detector mounting hole 129.

The second location restoration unit 370 may include a magnetic body like the first location restoration unit 360, and in the current embodiment, the second location restoration unit 370 includes a yoke. This is merely exemplary, and the second location restoration unit 370 may include another magnetic body. Accordingly, attractive force is formed between the second location restoration unit 370 and the magnet member 250 of the second driver 220, and the correction lens module 160 may adhere to the first base 120 or return to the initial location due to the attractive force.

Figure 4:
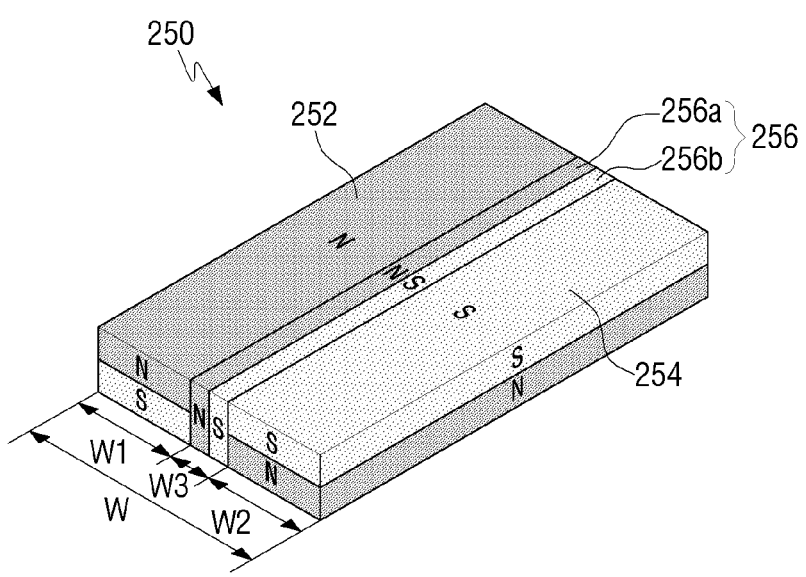
FIG. 4 is a perspective view illustrating a magnet member of the image stabilizer illustrated in FIG. 1.

FIG. 4 is a perspective view of the magnet member illustrated in FIG. 1.

Referring to FIG. 4, the magnet member 250 includes a first magnet 252, a second magnet 254, and a third magnet 256.

In the exemplary embodiment, the first magnet 252, the second magnet 254, and the third magnet 256 are coupled in one body to form the magnet member 250. The mutual coupling among the first magnet 252, the second magnet 252, and the third magnet 256 may be made through bonding. However, this is merely exemplary, and the mutual coupling of the first magnet 252, the second magnet 254, and the third magnet 256 may be made through another coupling process.

Figure 5:
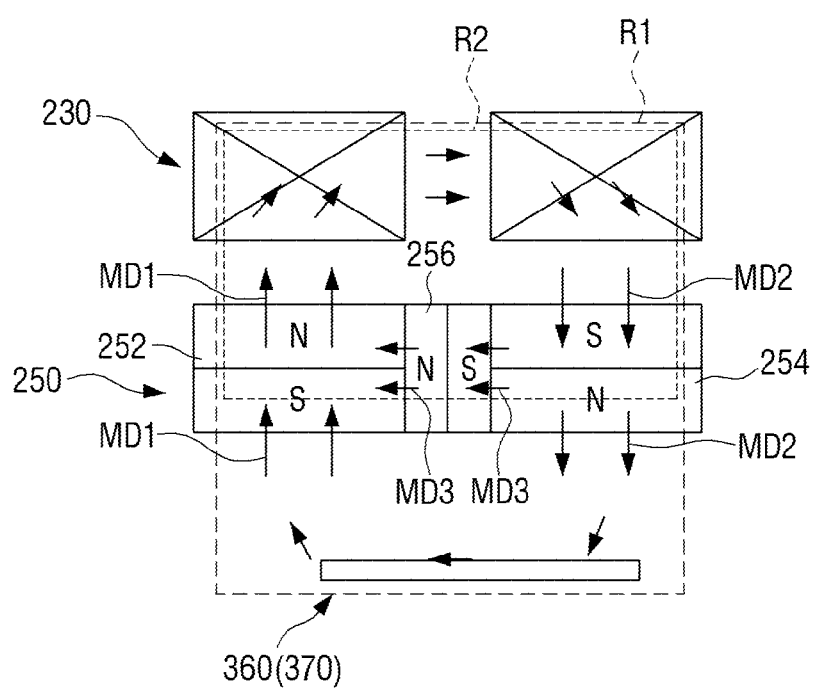
FIG. 5 is a diagram illustrating magnetic closed loops between a coil and a magnet member, and between the magnet member and a location restoration unit of the image stabilizer illustrated in FIG. 1.

The first magnet 252 is disposed close or proximate to the correction lens (162 of FIG. 1). The first magnet 252 is formed to in a manner such that a magnetic north (N) pole is a top portion and a magnetic south (S) pole is a bottom portion. Accordingly, as illustrated in FIG. 5, the first magnet 252 has a first magnetic field direction MD1 toward the coil 230.

The second magnet 254 is disposed to be spaced from the first magnet 252. The first magnet 252 and the second magnet 254 are disposed symmetrically with respect to the third magnet 256. In the exemplary embodiment, the second magnet 254 has the same shape as the first magnet 252, and the second magnet 254 and the first magnet 252 is each a lengthwise rectangular parallelepiped having a rectangular cross-section. Therefore, in the exemplary embodiment, a width W1 of the first magnet 252 is equal to a width W2 of the second magnet 254.

The second magnet 254 is formed in a manner such that a magnetic north (N) pole is a bottom portion and a magnetic south (S) pole is a top portion. Accordingly, as illustrated in FIG. 5, the second magnet 254 has a second magnetic field direction MD2 toward the location restoration units 360 and 370. That is, the second magnetic field direction MD2 is opposite of the first magnetic field direction MD1 of the first magnet 252.

The third magnet 256 is disposed between the first magnet 252 and the second magnet 254. One side of the third magnet 256 is in contact with the first magnet 252, and another side of the third magnet 256 is in contact with the second magnet 254. The third magnet 256 is formed in a manner such that a magnetic north (N) pole and a magnetic south (S) pole are horizontally symmetrical. Accordingly, the N pole portion 256a of the third magnet 256 is in contact with the first magnet 252, and the S pole portion 256b of the third magnet 256 is in contact with the second magnet 254.

As illustrated in FIG. 5, the third magnet 256 has a third magnetic field direction MD3 different from the first magnetic field direction MD1 of the first magnet 252 and the second magnetic field direction MD2 of the second magnet 254. In the exemplary embodiment, as illustrated in FIG. 5, the third magnetic field direction MD3 is perpendicular to the first magnetic field direction MD1 and the second magnetic field direction MD2, and is formed toward the first magnet 252 from the second magnet 254. However, this is merely exemplary, and the third magnetic field direction MD3 of the third magnet 256 may be formed toward the first magnet 252 from the second magnet 254 in an obliquely ascending direction or an obliquely descending direction.

FIG. 5 is a view illustrating magnetic closed loops between the coil and magnet member and between the magnet member and the location restoration unit of the image stabilizer illustrated in FIG. 1.

Referring to FIG. 5, when a voltage is applied to the coil 230 from the outside, a magnetic field is formed among the coil 230, the magnet member 250, and the location restoration units 360 and 370.

Magnetic flux moves according to the formation of the magnetic field. Magnetic flux emerging from the first magnet 252 flows in the first magnetic field direction MD1, through the coils 230, and then into the second magnet 254 in the second magnet direction MD2 of the second magnet 254. Magnetic flux emerging from the second magnet 254 flows in the second magnetic field direction MD2, through the location restoration units 360 and 370, and then into the first magnet 252 in the first magnetic field direction MD1 of the first magnet 252. The magnetic flux emerging from the first magnet 252 and the magnetic flux emerging from the second magnet 254 form a first magnetic closed loop R1, which circulates the first magnet 252, the coils 230, the second magnet 254, and the location restoration units 360 and 370.

When image stabilization is performed through the first magnetic closed loop R1, attractive force and repulsive force having desired magnitudes may be generated between the coils 230 and the magnet member 250 to move the correction lens module (160 of FIG. 2). Attractive force is generated between the magnetic members 250 and the location restoration units 360 and 370 to allow the correction lens module 160 to adhere to the first base (120 of FIG. 2) or to return to initial location.

A portion of the magnetic flux flowing in the second magnet 254 (from the magnetic flux emerging from the first magnet 252) flows into the first magnet 252 in the third magnetic field direction MD3. Here, the portion of the magnetic flux flowing in the second magnet 254 forms a second magnetic closed loop R2, which circulates the first magnet 252, the coils 230, the second magnet 254, and the third magnet 256.

The portion of the magnetic flux flowing in the second magnet 254 through the second magnet closed loop R2 may flow directly to the coils 230 through the third magnet 256 and the first magnet 252, not through the location restoration units 360 and 370. Therefore, in the exemplary embodiment, the magnetic flux can be focused toward the coils 230 when performing image stabilization, and thus driving force of the coils 230 may be improved.

Therefore, the image stabilizer (100 of FIG. 1) according to the exemplary embodiment can further improve the driving force of the coils 230 even with coil and magnet member having the same size as those of an image stabilizer of the related art in which distribution of magnetic flux is substantially uniformly divided between the coil and the magnet member and between the location restoration unit and the magnet member.

Further, the image stabilizer 100 according to the exemplary embodiment can generate the same intensity of driving force as the image stabilizer of the related art even when using coil and magnet member having smaller sizes than those of related art image stabilizer, and thus reduction in the driving force due to miniaturization of the magnet member may be prevented.

Figure 6:
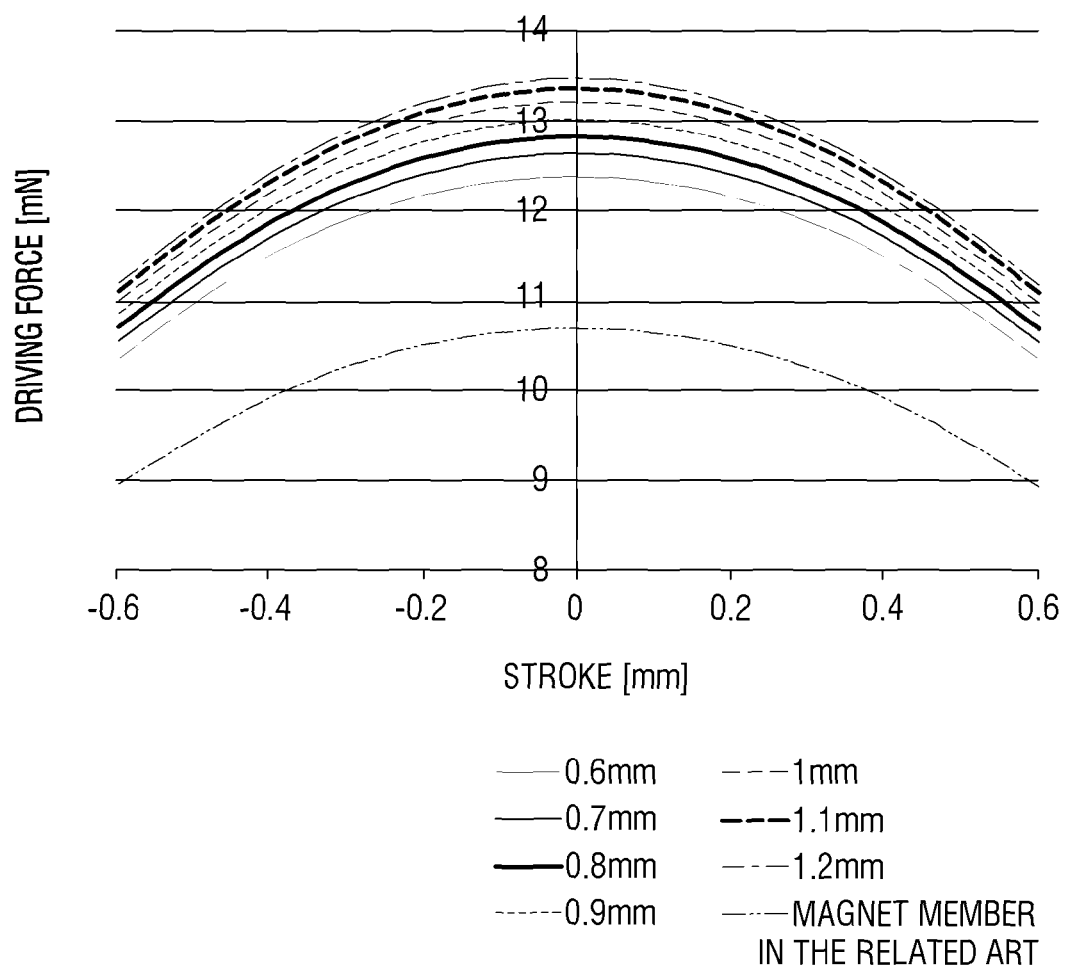
FIG. 6 is a graph illustrating change in driving force according to a stroke length and a thickness of a third magnet in a magnet member in FIG. 1.
Figure 7:
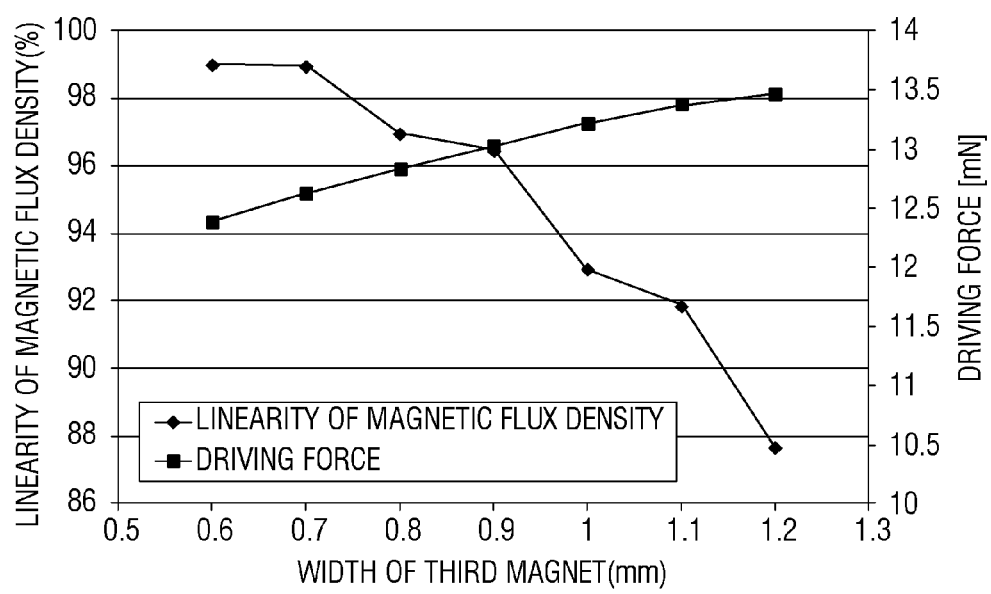
FIG. 7 is a graph illustrating a relationship between driving force and linearity of magnetic flux density according to a thickness of a third magnet in a magnet member of the image stabilizer illustrated in FIG. 1.

FIG. 6 is a view illustrating change in driving force according to a thickness of the third magnet in the magnet member of FIG. 1, and FIG. 7 is a view illustrating a relationship between driving force and linearity of flux density according to the thickness of the third magnet in the magnet member of FIG. 1.

Referring to FIG. 6, the driving force of the coil (230 of FIG. 5) is changed according to a stroke length (displacement) and a width of the magnet member (250 of FIG. 5). The driving force is maximum at a point in which a displacement of the magnet member 250 is 0 (zero), and as the displacement of the magnet member 250 is increased, the driving force is gradually reduced. It can be seen that the driving force of the magnet member 250 can be improved by the third magnet (256 of FIG. 4) as compared with the magnet member in the related art. In addition, the driving force is proportional to a width W3 of the third magnet (256 of FIG. 4). For example, as illustrated in FIG. 6, the driving force is larger in a state in which the width W3 of the third magnet 256 is 1.2 mm than in a state in which the width W3 of the third magnet 256 is 0.6 mm. Thus, the image stabilizer can further increase the driving force by increasing the width W3 of the third magnet 256 and by reducing the width W1 of the first magnet 252 and the width W2 of the second magnet 254, with the total width W of the magnet member 250 being constant.

On the other hand, when the width W3 of the third magnet 256 is increased above a certain value, the location detectors (see 310 and 320 of FIG. 1) may not detect the location of the correction lens module (see 160 of FIG. 2). This is based on the linearity of a magnetic flux density, and to detect the location of the magnet member 250, the location detectors 310 and 320 need the linearity of the magnetic flux density at their own location. When the width W3 of the third magnet 256 is increased above a certain value, the location detectors (see 310 and 320 of FIG. 1) may not maintain the linearity of the magnetic flux density. Therefore, the width W3 of the third magnet 256 may have to be set by taking into consideration the linearity of the magnetic flux density when the location detectors 310 and 320 are provided in the image stabilizer 100.

Referring to FIG. 7, the linearity of the magnetic flux density is inversely proportional to the width W3 of the third magnet (see 256 of FIG. 4). Since the driving force of the coil (see 230 of FIG. 5) is proportional to the width W3 of the third magnet 256, the width W3 of the third magnet 256 may be determined by appropriately taking into consideration the driving force and linearity of the magnetic flux density. FIG. 7 illustrates a relationship between the linearity of the magnetic flux density and the driving force according to the width W3 of the third magnet 256 when the total width W of the magnet member 250 is 5.2 mm. As illustrated in FIG. 7, it can be seen that it is most preferable that the width W3 of the third magnet 256 be 0.9 mm when both the driving force and the linearity of the magnetic flux density are considered. When the total width W of the magnet member 250 is 5.2 mm, the width W3 of the third magnet 256 may be preferably 0.9 mm. When the total width W of the magnet member 250 is changed, the width W3 of the third magnet 256 may also be changed.

Figure 8:
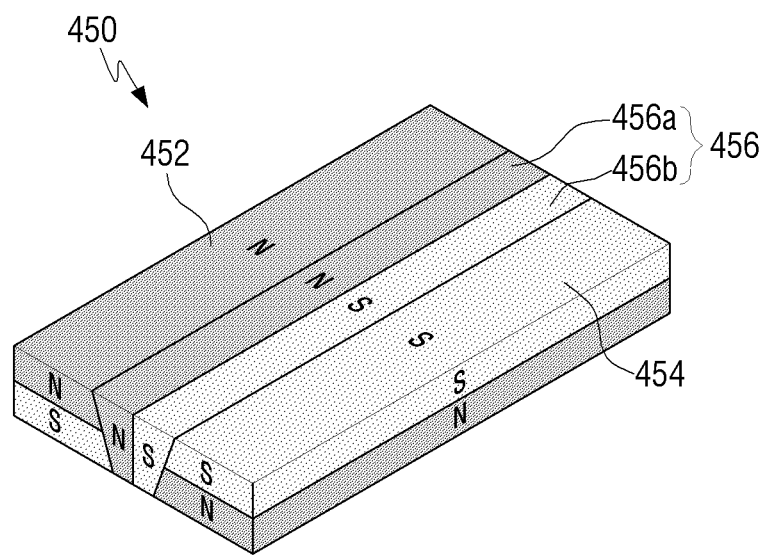
FIGS. 8 and 9 are perspective views illustrating magnet members, according to another exemplary embodiment.
Figure 9:
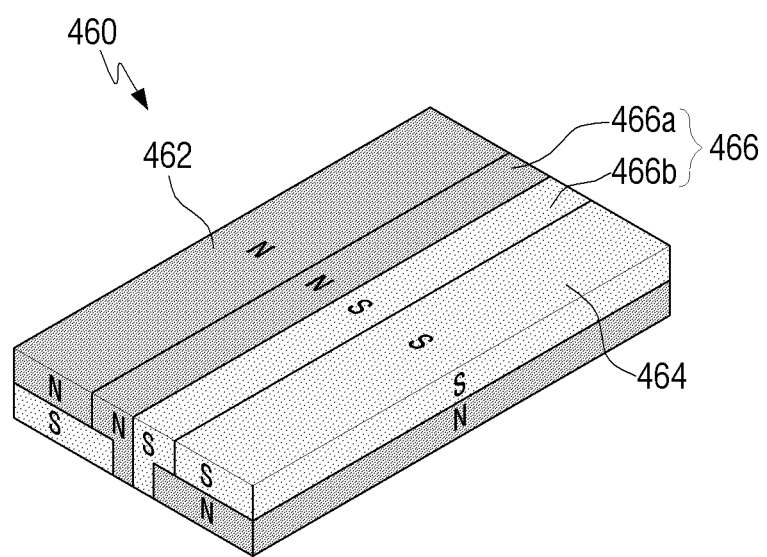

FIGS. 8 and 9 are perspective views of magnet members, according to another exemplary embodiment.

Referring to FIG. 8, the magnet member 450 includes a first magnet 452, a second magnet 454, and a third magnet 456.

The third magnet 456 is formed to have a cross-section of a trapezoidal shape. A magnetic N pole portion 456a of the third magnet 456 is in contact with the first magnet 452, and a magnetic S pole portion 456b of the third magnet 456 is in contact with the second magnet 454. Therefore, a portion of the first magnet 452 in contact with the magnetic N pole portion 456a of the third magnet 456 is obliquely formed to correspond to (or align with) the magnetic N pole portion 456a of the third magnet 456. A portion of the second magnet 454 in contact with the magnetic S pole portion 456b of the third magnet 456 is obliquely formed to correspond to (or align with) the magnetic S pole portion 456b of the third magnet 456.

In this way, the third magnet 456 may have the cross-section of a trapezoidal shape. Thus, the magnet 450 can improve assembly when the first magnet 452, the second magnet 454, and the third magnet 456 are coupled.

Referring to FIG. 9, a magnet member 460 includes a first magnet 462, a second magnet 464, and a third magnet 466.

The third magnet 466 is formed to have a T-shaped cross-section. A magnetic N pole portion 466a of the third magnet 466 is in contact with the first magnet 462, and a magnetic S pole portion 466b of the third magnet 466 is in contact with the second magnet 464. Accordingly, a portion of the first magnet 462 in contact with the magnetic N pole portion 466a of the third magnet 466 is formed in a stepwise shape to correspond to (or align with) the magnetic N pole portion 466a of the third magnet 466. A portion of the second magnet 464 in contact with the magnetic S pole portion 466b of the third magnet 466 is formed in a stepwise shape to correspond to (or align with) the magnetic S pole portion 466b of the third magnet 466.

In this way, the third magnet 466 may be formed to have the T-shaped cross-section, and the magnet member 460 can improve assembly as in FIG. 8. The shape of the third magnet 466 may have any other shape when the magnetic flux flowing in the second magnet 464 flows to the first magnet 462 through the third magnet 466 during image stabilization.

Figure 10:
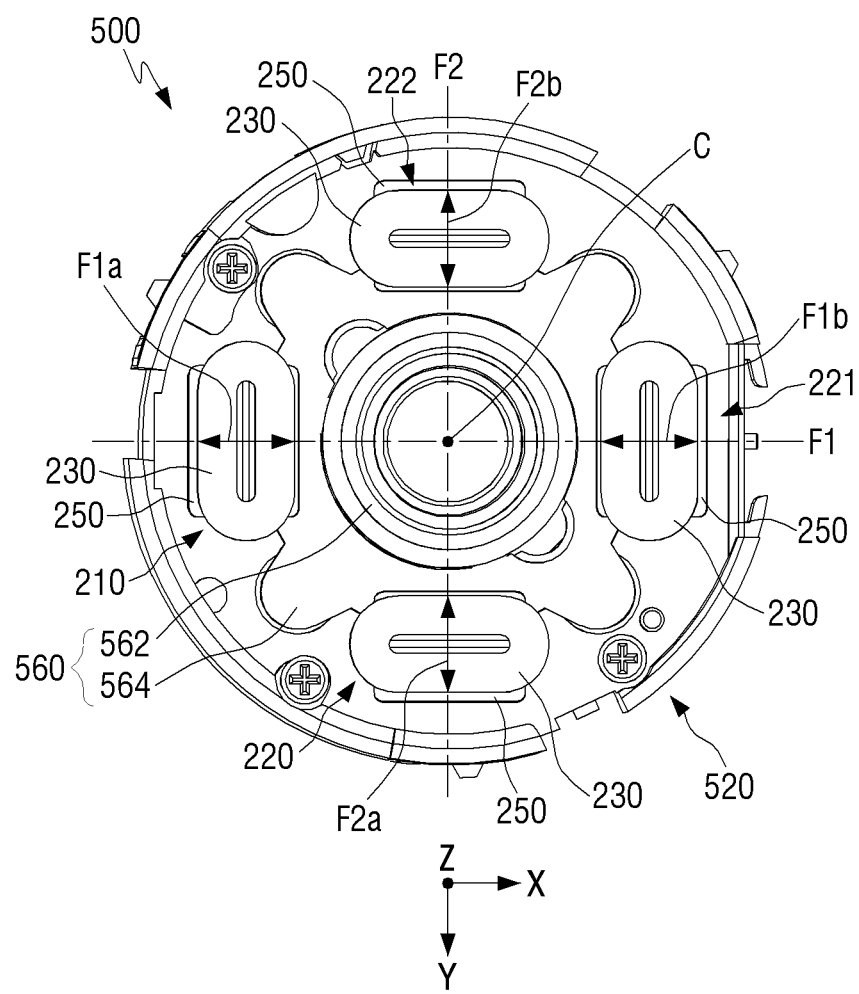
FIG. 10 is a top view illustrating an image stabilizer, according to another exemplary embodiment.
Figure 11:
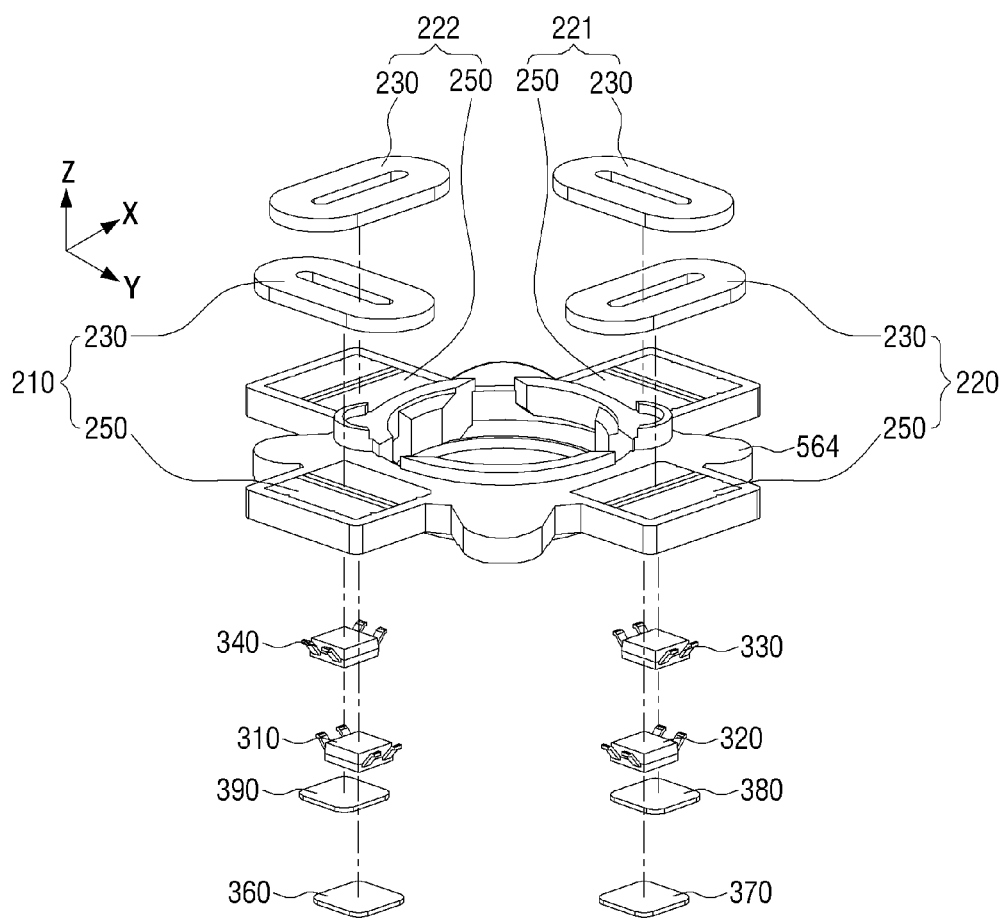
FIG. 11 is an exploded perspective view illustrating an arrangement of a coil, a magnet member, a location detector, and a location restoration unit included in the image stabilizer of FIG. 10.

FIG. 10 is a top view illustrating an image stabilizer, according to another embodiment. FIG. 11 is an exploded perspective view illustrating an arrangement of a coil, a magnet member, a location detector, and a location restoration unit included in the image stabilizer illustrated in FIG. 10. An image stabilizer 500 to be described later has the same configuration as that of the image stabilizer 100 according to the above-described embodiment, and thus detailed description thereof will be omitted.

Although the image stabilizer 100 according to the above-described embodiment includes the coil, the magnet member, the location detector, and the location restoration unit in two, respectively, the image stabilizer 500 according to the embodiment includes the coil, the magnet member, the location detector, and the location restoration unit in four, respectively.

Referring to FIGS. 10 and 11, the image stabilizer 500 according to another embodiment may includes a plurality of drivers 210, 220, 221, and 222, a plurality of location detectors 310, 320, 330, and 340, and a plurality of location restoration units 360, 370, 380, and 390.

The plurality of drivers 210, 220, 221, and 222 include a first driver 210, a second driver 220, a third driver 221, and a fourth driver 222.

The first driver 210 allows a correction lens module 560 to move in a first direction (an X-axis direction) with respect to a first base 520, and includes a coil 230 and a magnet member 250.

The second driver 220 allows the correction lens module 560 to move in a second direction (a Y-axis direction) with respect to the first base 520, and includes a coil 230 and a magnet member 250 like the first driver 210.

The third driver 221 allows the correction lens module 560 to move in the first direction (the X-axis direction) with respect to the first base 520 together with the first driver 210, and includes a coil 230 and a magnet member 250 like the first driver 210. The third driver 221 is disposed to face the first driver 210 with respect to an optical axis (a Z-axis).

The fourth driver 222 allows the correction lens module 560 to move in the second direction (the Y-axis direction) with respect to the first base 520 together with the second driver 220, and includes a coil 230 and a magnet member 250 like the first driver 210. The fourth driver 222 is disposed to face the second driver 220 with respect to the optical axis (the Z-axis).

When a voltage is applied to the coil 230 of the first driver 210, the coil 230 of the second driver 220, the coil 230 of the third driver 221 and the coil 230 of the fourth driver 222 from the outside, electromagnetic force is generated in the coil 230 of the first driver 210, the coil 230 of the second driver 220, the coil 230 of the third driver 221, and the coil 230 of the fourth driver 222. Accordingly, attractive force and repulsive force having desired magnitudes may be generated between the coil 230 and the magnet member 250 of the first driver 210, between the coil 230 and the magnet member 250 of the second driver 220, between the coil 230 and the magnet member 250 of the third driver 221, and between the coil 230 and the magnet member 250 of the fourth driver 222. Thus, the correction lens module 560 may move by the coils 230 of the first to fourth drivers 210, 220, 221, and 222.

As illustrated in FIG. 10, a driving force action line F1a in the coil 230 of the first driver 210 and a driving force action line F1b in the coil 230 of the third driver 221 are arranged to coincide with a driving force action line F1 crossing the center C of the correction lens 562 (at this time, the center C of the correction lens 562 is located on the optical axis). A driving force action line F2a in the coil 230 of the second driver 220 and a driving force action line F2b in the coil 230 of the fourth driver 222 are arranged to coincide with a driving force action line F2 crossing the center C of the correction lens 562 (at this time, the center C of the correction lens 562 is located on the optical axis). Therefore, the correction lens module 560 is moved along the driving force action lines F1 and F2 by the coils 230 of the first to fourth drivers 210, 220, 221, and 222. At this time, a correction lens supporting plate 564 may be moved by ball bearings (not shown) with respect to the first base 520.

The plurality of location detectors 310, 320, 330, and 340 include a first location detector 310, a second location detector 320, a third location detector 330, and a fourth location detector 340.

The first location detector 310 is disposed to be spaced from the magnet member 250 of the first driver 210 and on a side of the magnet member 250 of the first driver 210 that is opposite of the side to which the coil 230 of the first driver 210 is disposed. The second location detector 320 is disposed to be spaced from the magnet member 250 of the second driver 220 and on a side of the magnet member 250 of the second driver 220 that is opposite of the side to which the coil 230 of the second driver 220 is disposed. The third location detector 330 is disposed to be spaced from the magnet member 250 of the third driver 221 and on a side of the magnet member 250 of the third driver 221 that is opposite of the side to which the coil 230 of the third driver 221 is disposed. The fourth location detector 340 is disposed to be spaced from the magnet member 250 of the fourth driver 222 and on a side of the magnet member 250 of the fourth driver 222 that is opposite of the side to which the coil 230 of the fourth driver 222 is disposed.

The first location detector 310 and the third location detector 330 may detect movement of the correction lens module 560 in the first direction (the X-axis direction). The second location detector 320 and the fourth location detector 340 may detect movement of the correction lens module 560 in the second direction (the Y-axis direction). As in the above-described embodiment, the first to fourth location detectors 310 to 340 may include Hall sensors or other sensors.

The plurality of location restoration units 360, 370, 380, and 390 include a first location restoration unit 360, a second location restoration unit 370, a third location restoration unit 380, and a fourth location restoration unit 390.

The first location restoration unit 360 is disposed on a side of the first location detection 310 that is opposite of the side to which the first driver 210 is disposed. The second location restoration unit 370 is disposed on a side of the second location detector 320 that is opposite of the side to which the second driver 220 is disposed. The third location restoration unit 380 is disposed on a side of the third location detector 330 that is opposite of the side to which the third driver 221 is disposed. The fourth location restoration unit 390 is disposed on a side of the fourth location detector 340 that is opposite of the side to which the fourth driver 222 is disposed.

The first to fourth location restoration units 360 to 390 may include magnetic bodies as in the above-described embodiment, and may include yokes. This is merely exemplary, and the first to fourth location restoration units 360 to 390 may include another magnetic body. The first to fourth location restoration units 360 to 390 may allow the correction lens module 560 to adhere to the first base 520, or restore the correction lens module 160 to an initial location.

The image stabilizer 500 according to the embodiment may further include the third driver 221 and the fourth driver 222 in addition to the first driver 210 and the second driver 220 to further improve driving force during image stabilization.

Figure 12:
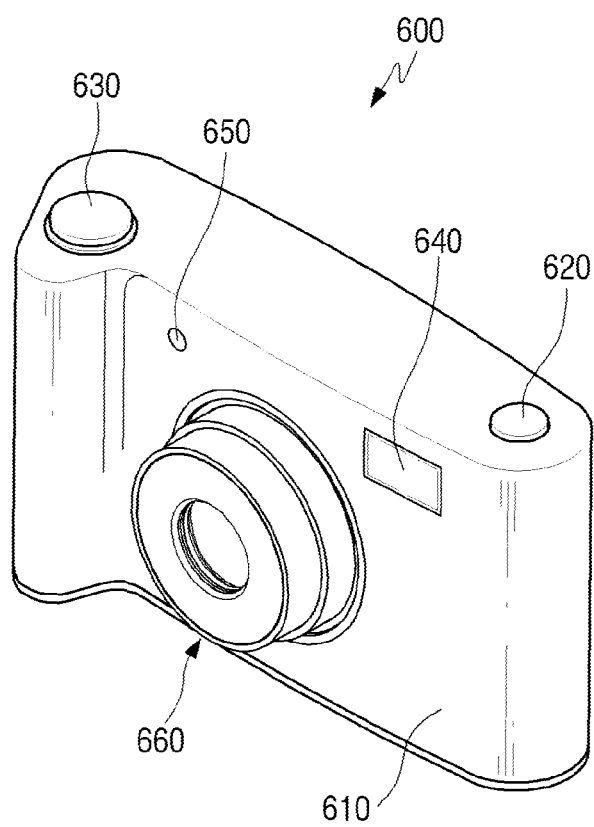
FIG. 12 is a perspective view of a digital photographing apparatus including an image stabilizer, according to various exemplary embodiments.

FIG. 12 is a perspective view illustrating a digital photographing apparatus including an image stabilizer, according to various exemplary embodiments. While a digital photographing apparatus is shown in FIG. 12, the image stabilizer may be implemented in any electronic device having image capturing or photographing capabilities.

Referring to FIG. 12, a digital camera 600 (as a digital photographing apparatus of the exemplary embodiment) includes a power switch 620 disposed on one side of a top of a camera body 610 and a shutter release button 630 disposed in the other side of the top of the camera body 610. Further, a flash 640 and a flash-light amount sensor 650 are disposed in an upper front region of the camera body 610, and a zoomable lens unit 660 is disposed in a center front region of the camera body 610. A view finder (not shown) may be provided in a rear side of the camera body 610.

Further, a self-timer lamp (not shown) may be provided in the camera body 610. The self-timer lamp operates in a time period from a point of time when the shutter release button 630 is pressed to a point of time when an image is captured in a self-timer mode. The flash-light amount sensor 650 detects the amount of light emitted by the flash 640 and input the detected result to a digital camera processor (not shown) through a microcontroller (not shown) when the flash 640 operates.

The digital camera 600 may include an image stabilizer according to the above-described exemplary embodiments and modified examples thereof.

Thus, the digital camera 600 can improve performance of the image stabilizer by increasing driving force of the image stabilizer. As compared with an image stabilizer in the related art, the same driving force can be implemented through a coil and magnet having a smaller size than those in the image stabilizer of the related art to promote miniaturization of the image stabilizer, and to implement miniaturization of the digital camera.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An image stabilizer comprising:
   a correction lens module including a correction lens and a correction lens supporting plate to which the correction lens is coupled;
   a plurality of drivers configured to move the correction lens module in a direction perpendicular to an optical axis, each driver including a magnet member fixed to the correction lens supporting plate and a coil configured to react to the magnet member; and
   a plurality of location restoration units disposed to face the plurality of drivers, configured to restore the lens correction module to an initial location, and including magnetic bodies,
   wherein the magnet member includes a first magnet, a second magnet, and a third magnet coupled in one body, and
   wherein the first magnet, the second magnet, and the third magnet each have magnetic field directions different from one another.

2. The image stabilizer according to claim 1, wherein:
   the first magnet is disposed proximate to the correction lens and has a first magnetic field direction;
   the second magnet is disposed to be spaced from the first magnet and has a second magnetic field direction opposite of the first magnetic field direction; and
   the third magnet is disposed between the first and second magnets and has a third magnetic field direction different from the first and second magnetic field directions.

3. The image stabilizer according to claim 2, wherein:
   the magnet member is disposed between the coil and a corresponding location restoration unit of the plurality of location restoration units;
   when image stabilization is performed,
       magnetic flux emerging from the first magnet in the first magnetic field direction flow through the coil and into the second magnet in the second magnetic field direction,
       magnetic flux emerging from the second magnet in the second magnetic field direction flows through the corresponding location restoration unit and into the first magnet in the first magnetic field direction,
   wherein the magnetic flux emerging from the first magnet and the magnetic flux emerging from the second magnet form a first magnetic closed loop circulating the first magnet, the coil, the second magnet, and the location restoration unit; and
   a portion of the magnetic flux emerging from the first magnet to flow into the second magnet flows back into the first magnet via the third magnet in the third magnetic field direction, so that a second magnetic closed loop circulating the first magnet, the coil, the second magnet, and the third magnet is formed.

4. The image stabilizer according to claim 2, wherein the third magnetic field direction is perpendicular to the first magnetic field direction and the second magnetic field direction.

5. The image stabilizer according to claim 1, wherein the first magnet and the second magnet are disposed symmetrically with respect to the third magnet, and magnetic poles of the first magnet are opposite of magnetic poles of the second magnet.

6. The image stabilizer according to claim 1, wherein a cross-section of the third magnet is a shape selected from the group consisting of a tetragonal shape, a trapezoidal shape, and a T-character shape.

7. The image stabilizer according to claim 1, wherein the first magnet, the second magnet, and the third magnet are mutually coupled through bonding.

8. The image stabilizer according to claim 1, further comprising:
   a plurality of location detectors disposed between the plurality of drivers and the plurality of location restoration units, respectively, and configured to detect movement of the correction lens module.

9. The image stabilizer according to claim 8, wherein the plurality of drivers comprises:
   a first driver configured to move the correction lens module in a first direction perpendicular to the optical axis; and
   a second driver configured to move the correction lens module in a second direction perpendicular to the first direction and the optical axis.

10. The image stabilizer according to claim 9, wherein:
    the plurality of location restoration units comprises a first location restoration unit and a second location restoration unit;
    a magnet member of the first driver is disposed between the first location restoration unit and a coil of the first driver; and
    a magnet member of the second driver is disposed between the second location restoration unit and a coil of the second driver.

11. The image stabilizer according to claim 10, wherein the plurality of location detectors include:
    a first location detector disposed between the first driver and the first location restoration unit and configured to detect movement of the correction lens module in the first direction; and
    a second location detector disposed between the second driver and the second location restoration unit and configured to detect movement of the correction lens module in the second direction.

12. The image stabilizer according to claim 11, wherein the plurality of drivers further comprises:
   a third driver disposed opposite of the first driver with respect to the optical axis and configured to move the correction lens module in the first direction together with the first driver; and
   a fourth driver disposed opposite of the second driver with respect to the optical axis and configured to move the correction lens module in the second direction together with the second driver.

13. The image stabilizer according to claim 12, wherein:
   the plurality of location restoration units further comprises a third location restoration unit and a fourth location restoration unit;
   a magnet member of the third driver is disposed between the third location restoration unit and a coil of the third driver; and
   a magnet member of the fourth driver is disposed between the fourth location restoration unit and a coil of the fourth driver.

14. The image stabilizer according to claim 13, wherein the plurality of location detectors further comprises:
   a third location detector disposed between the third driver and the third location restoration unit and configured to detect the movement of the correction lens module in the first direction; and
   a fourth location detector disposed between the fourth driver and the fourth location restoration unit and configured to detect the movement of the correction lens module in the second direction.

15. The image stabilizer according to claim 1, further comprising:
   a base configured to support the correction lens supporting plate to be movable to the direction perpendicular to the optical axis; and
   a cover part coupled to the base to cover the correction lens supporting plate,
   wherein the coil is fixed to a bottom portion of the cover part.

16. The image stabilizer according to claim 8, wherein a width of the third magnet is in a range of about 0.6 mm to about 1.2 mm.

17. The image stabilizer according to claim 16, wherein the width of the third magnet is about 0.9 mm.

18. The image stabilizer according to claim 1, wherein the plurality of location restoration units comprises yokes.

19. The image stabilizer according to claim 8, wherein the plurality of location detectors comprise Hall sensors.

20. An electronic apparatus including the image stabilizer according to claim 1.

* * * * *